(12) United States Patent
Yamazaki

(10) Patent No.: US 7,774,532 B2
(45) Date of Patent: Aug. 10, 2010

(54) PROCESSING DEVICE, FAILURE RECOVERY METHOD THEREFOR, AND FAILURE RESTORATION METHOD

(75) Inventor: Shinya Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 254 days.

(21) Appl. No.: 11/365,995

(22) Filed: Mar. 2, 2006

(65) Prior Publication Data
US 2006/0198314 A1    Sep. 7, 2006

(30) Foreign Application Priority Data

Mar. 3, 2005  (JP) .............................. 2005-058981
Feb. 8, 2006  (JP) .............................. 2006-031099

(51) Int. Cl.
G06F 12/00 (2006.01)
G06F 3/00 (2006.01)
G06F 5/00 (2006.01)
G06F 13/00 (2006.01)

(52) U.S. Cl. ...................... 710/240; 710/36; 710/38; 710/51; 710/107

(58) Field of Classification Search .............. 710/62, 710/36, 38, 51, 107, 240, 316
See application file for complete search history.

(56) References Cited

U.S. PATENT DOCUMENTS

| | | | |
|---|---|---|---|
| 6,049,825 A | 4/2000 | Yamamoto | |
| 6,229,538 B1 * | 5/2001 | McIntyre et al. | 715/734 |
| 6,282,675 B1 | 8/2001 | Sun et al. | |
| 6,401,221 B1 | 6/2002 | Sun et al. | |
| 6,681,345 B1 | 1/2004 | Storino et al. | |
| 6,748,556 B1 | 6/2004 | Storino et al. | |
| 2002/0162045 A1 | 10/2002 | Shiragaki | |
| 2005/0068169 A1 * | 3/2005 | Copley et al. | 340/539.13 |

FOREIGN PATENT DOCUMENTS

JP         62-035737          2/1987

(Continued)

OTHER PUBLICATIONS

Japan Office Action dated Apr. 7, 2009 in counterpart Japan application, 2 pgs.

*Primary Examiner*—Alford W Kindred
*Assistant Examiner*—Farley J Abad
(74) *Attorney, Agent, or Firm*—Foley & Lardner LLP

(57) ABSTRACT

A processing device includes a processor which executes first and second pieces of control software in a memory to perform processing, and a device 1 having a plurality of SLOTs 1 to 8 to electrically connect the processor to a plurality of device. The device 1 switches a SLOT which connects devices 2 and 3 between a SLOT 1 or 2 and a spare SLOT 8 allocated in advance through a switch. The processor executes the first and second pieces of control software to manage SLOT information including pieces of path information obtained through the SLOTs 1, 2, and 8 between the devices 1 and 2 such that the SLOT information can be registered and updated. When a failure occurs in the SLOT 1 or 2, the processor updates the path information obtained through the SLOT 1 into the path information obtained through the spare SLOT, and the SLOT which connects the devices 2 and 3 is switched from the SLOT 1 or 2 to the spare SLOT 8.

10 Claims, 6 Drawing Sheets

FOREIGN PATENT DOCUMENTS

| | | |
|---|---|---|
| JP | 62-106564 A | 5/1987 |
| JP | 64-017128 A | 1/1989 |
| JP | 04-057135 A | 2/1992 |
| JP | 04-184656 B2 | 7/1992 |
| JP | 06-110800 | 4/1994 |
| JP | 06-209351 | 7/1994 |
| JP | 07-141077 A | 6/1995 |
| JP | 08-163004 A | 6/1996 |
| JP | 08-305592 A | 11/1996 |
| JP | 09-116491 A | 5/1997 |
| JP | 09-252331 | 9/1997 |
| JP | 10-320327 | 12/1998 |
| JP | 2000-293315 A | 10/2000 |
| JP | 2002-044178 A | 2/2002 |
| JP | 2002-077186 A | 3/2002 |
| JP | 2002-108630 A | 4/2002 |
| JP | 2002-123402 A | 4/2002 |
| JP | 2002-330121 A | 11/2002 |
| JP | 2004-164671 A | 6/2004 |
| JP | 2004-178124 A | 6/2004 |

* cited by examiner

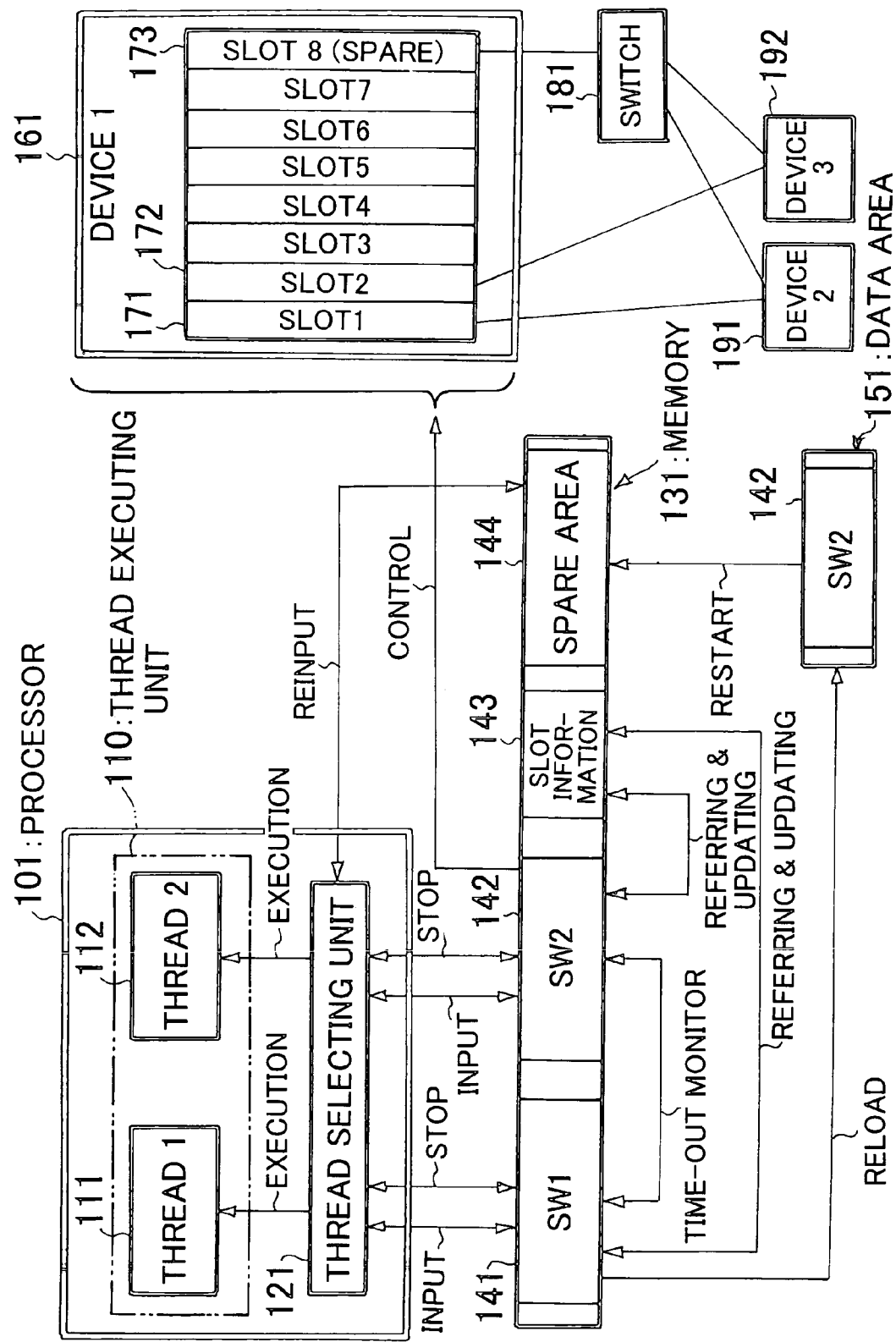

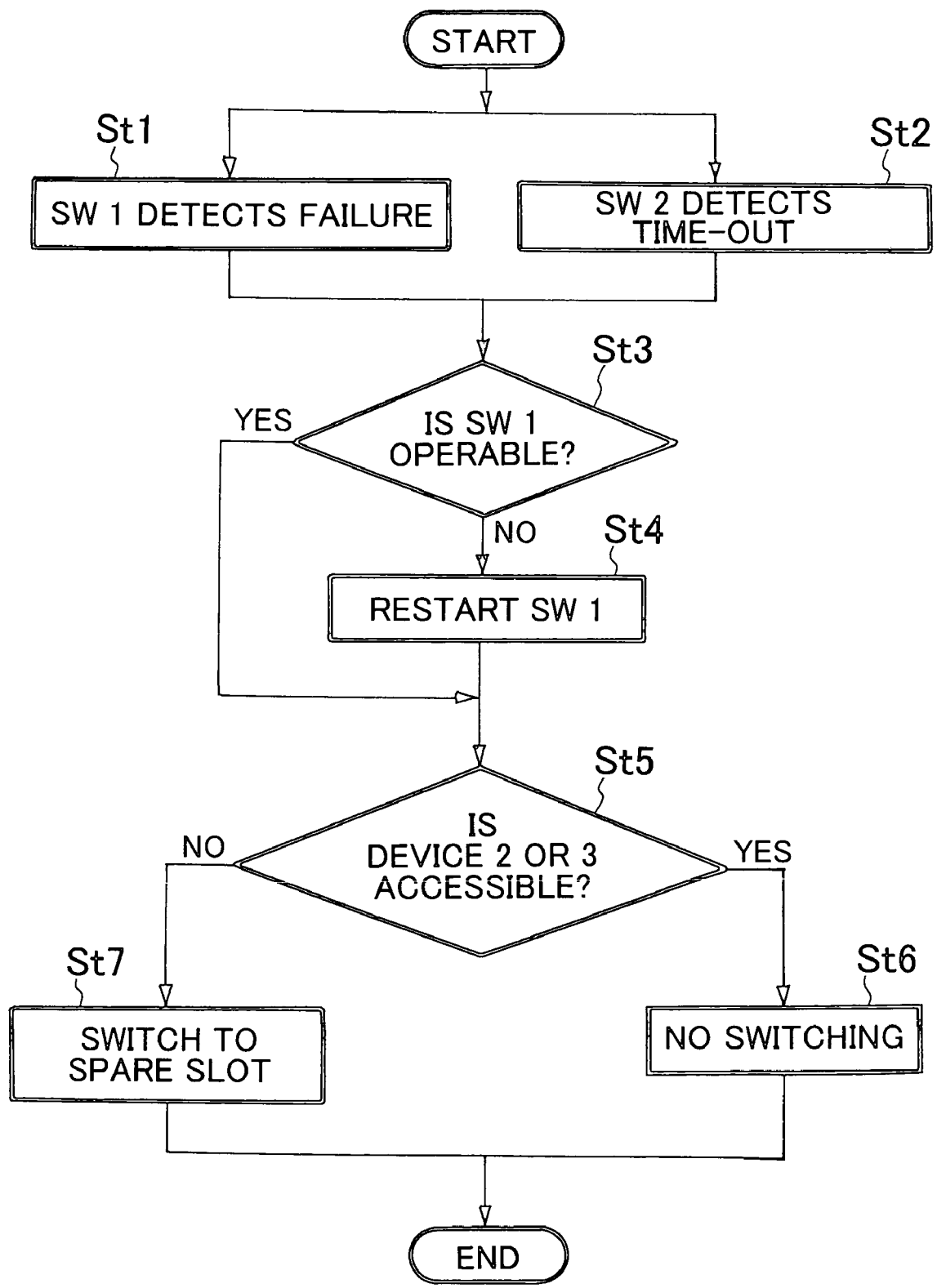

FIG.3A

| SW (201) | HW THREAD (202) | MEMORY SPACE (203) | PATH (204) | SPARE RESOURCE (205) | FAILURE INFORMATION (206) |
|---|---|---|---|---|---|
| SW1 | THREAD 2 | MEMORY SPACE 2 | DEVICE 1 – SLOT 1 – DEVICE 2 | THREAD 1, MEMORY SPACE 3, DEVICE 1 – SLOT 8 – SWITCH – DEVICE 2 | — |
| SW1 | THREAD 2 | MEMORY SPACE 2 | DEVICE 2 – SLOT 2 – DEVICE 3 | THREAD 1, MEMORY SPACE 3, DEVICE 1 – SLOT 8 – SWITCH – DEVICE 3 | — |
| SW2 | THREAD 1 | MEMORY SPACE 1 | — | THREAD 2, MEMORY SPACE 3, | — |

(BEFORE FAILURE OF SLOT 1 OCCURS)

143: SLOT INFORMATION

FIG.3B

| SW (201) | HW THREAD (202) | MEMORY SPACE (203) | PATH (204) | SPARE RESOURCE (205) | FAILURE INFORMATION (206) |
|---|---|---|---|---|---|
| SW1 | THREAD 2 | MEMORY SPACE 2 | DEVICE 1 – SLOT 8 – SWITCH – DEVICE 2 | THREAD 1, MEMORY SPACE 3 | DEVICE 1 – SLOT 1 – DEVICE 2 |
| SW1 | THREAD 2 | MEMORY SPACE 2 | DEVICE 2 – SLOT 2 – DEVICE 3 | THREAD 1, MEMORY SPACE 3, | — |
| SW2 | THREAD 1 | MEMORY SPACE 1 | — | THREAD 2, MEMORY SPACE 3, | — |

(AFTER FAILURE OF SLOT 1 OCCURS)

143: SLOT INFORMATION

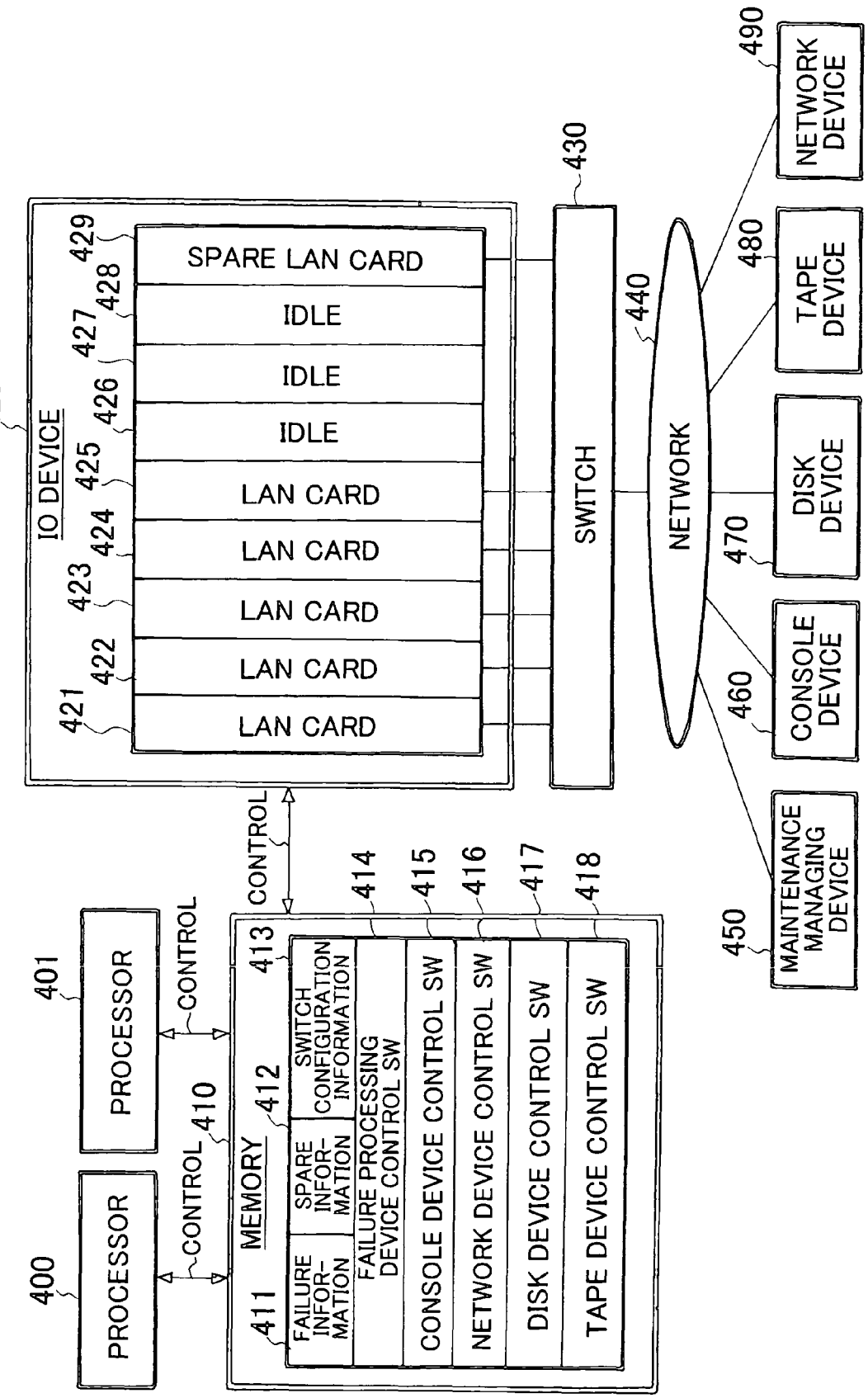

SPARE SLOT SWITCHING PROCESS

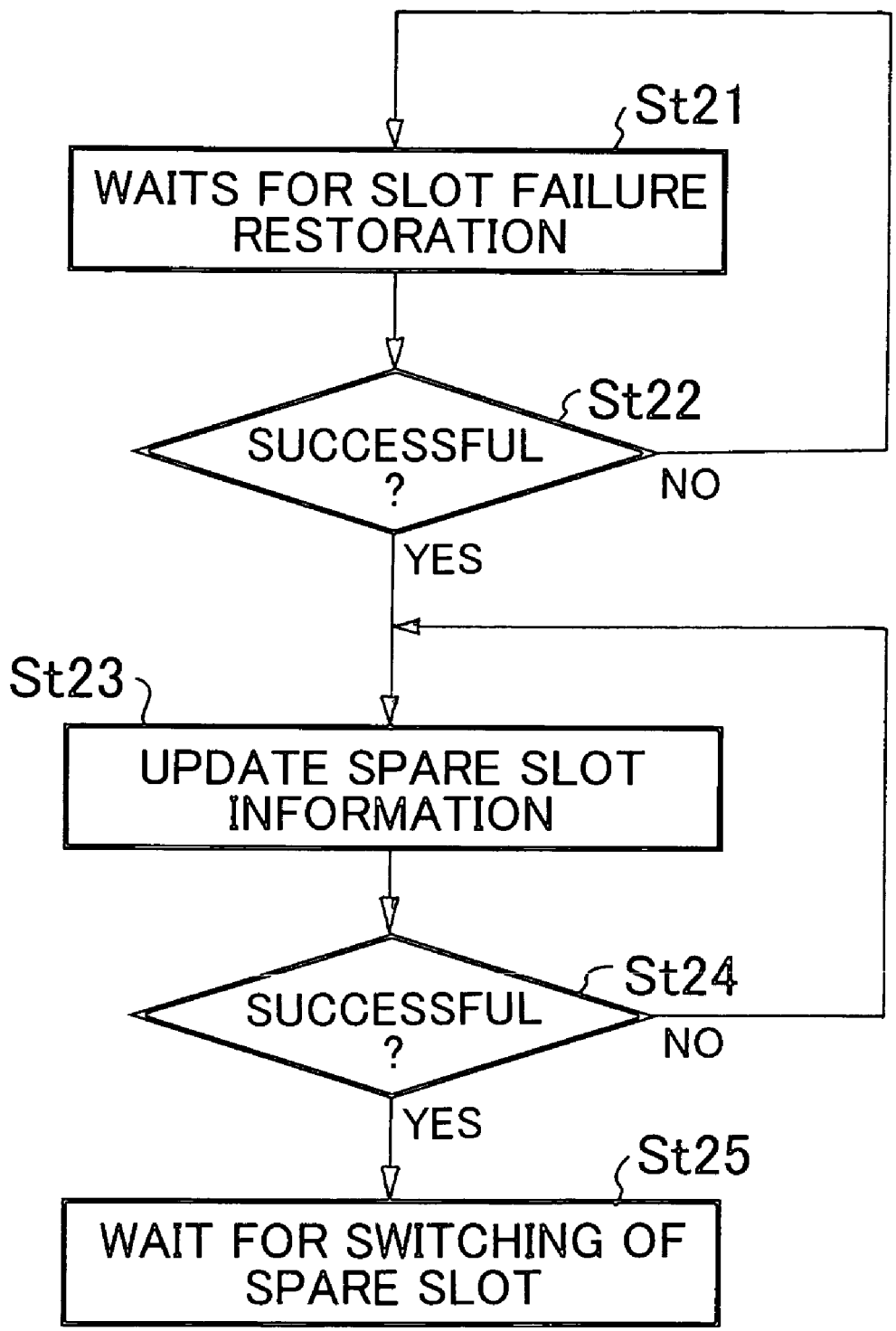

PROCESSING DEVICE, FAILURE RECOVERY METHOD THEREFOR, AND FAILURE RESTORATION METHOD

BACKGROUND OF THE INVENTION

1. Field of the Invention

The present invention relates to a processing device, a failure recovery method therefor, and a failure restoration method and, more particularly, to a technique about a countermeasure against a failure of a processing device in which a processor is connected to a plurality of devices through a plurality of slots.

2. Description of the Related Art

In recent years, although improvement of a clock frequency of a processor hits its peak due to a problem of a power consumption or limitation of micropatterning, since a new technique such as an on-chip multiprocessor or a multispread processor is researched and developed, the capability of 1-chip processor process is dramatically improved. Accordingly, an operation environment of software (SW) has varied. For example, the number of multiprocess and the number of multithreaded processes increase. With the increase in number of processes described above, unrealized processing can be made possible, and research and development are being actively performed now.

Accordingly, a countermeasure against a failure of a computer system using a processor having improved processing capability becomes more important. For example, in a conventional countermeasure against a failure, in preparation for occurrence of a failure in a card loaded in a SLOT or a path under control of the card, a method of multiplexing SLOTs is used. As conventional technique documents about countermeasures against failures, the following documents are known.

For example, a multithread processor (for example, see JP-A-2002-123402 and JP-A-2002-108630) which reinputs a thread when one of memory elements arranged in units of threads is broken down is known. In addition, a print automatic restoring apparatus (for example, see JP-A-2004-178124), a failure allowable architecture for incircuit programming (for example, see JP-A-2004-164671), a computer automatic switching method (for example, see JP-B2-2773424), and an inter-task communication failure processing method (for example, see JP-A-04-057135) are also known. An active/spare switching control method for an information processing system (for example, see JP-A-62-106564) a communication apparatus which performs automatic failure restoration and an automatic failure restoration method (for example, see JP-A-2002-330131), an inter-apparatus connection method and a multiplexing apparatus, and a switching apparatus for a multiplexing apparatus (for example, see JP-A-2002-077186) are also known. A domain region dynamic arrangement method for a virtual computer (for example, see JP-A-01-017128), a dynamic LAN control apparatus switching method (for example, JP-A-09-167128), a high-speed network address takeover method, and a network apparatus and program (for example, see JP-A-2005-136690) are also known. Furthermore, a method of keeping an optimum system availability by resource restoration (for example, JP-A-2002-132697), a broken processor replacing method, medium, and system (for example, see JP-A-2004-318885) are still also known.

However, in order to realize multiplexing in the conventional technique, parts such as a SLOT and a card must be prepared to disadvantageously increase costs. In occurrence of a failure, a maintenance person must specify a broken part and replace the broken part with a new part within limited time. For this reason, recovery operation time must be disadvantageously long.

SUMMARY OF THE INVENTION

The present invention has been made in consideration of the above conventional circumferences and has as its object to reduce costs required for multiplexing and to shorten recovery operation time for a failure.

In order to achieve the above object, according to the present invention, there is provided a processing device comprises: a processor configured to execute a predetermined control software stored in a memory to perform processing; and a connecting unit having a plurality of slots to electrically connect a plurality of devices to the processor. The connecting unit is configured to switch, as a slot to which the device is connected, an arbitrary slot and a predetermined spare slot to each other in the plurality of slots. The processor comprises: a managing unit configured to manage slot information including path information between the processor and the device through the slot such that the slot information can be registered and updated; and a control unit configured to control the connecting unit such that the slot to which the device is connected is switched from the arbitrary slot to the spare slot on the basis of the slot information when a failure occurs in the arbitrary slot.

In the processing device according to the present invention, the processor may further comprise: a unit configured to update the slot information from path information obtained through the arbitrary slot to path information obtained through the spare slot in switching to the spare slot; and a unit configured to control switching from the arbitrary slot to the spare slot by the connecting unit on the basis of the updated slot information.

The processor may further comprise: a unit configured to update an idle slot which is not connected to the device in the plurality of slots into spare slot information; and a unit configured to cause the idle slot to function as the spare slot on the basis of the updated spare slot information.

The connecting unit may have a switch which can be connected to the spare slot, the switch being configured to make it possible to connect the device connected to the arbitrary slot to the spare slot.

The connecting unit may have a switch which can be connected to the arbitrary slot including the spare slot, and the switch being configured to make it possible to connect the processor to the device.

The predetermined control software may comprise: a first control software to control operations of the devices; and a second control software to control operations of the slots of the connecting unit, and the processor may comprise: a processing unit configured to perform a process of executing the first control software when the second control software is inoperative to reinput the predetermined control software in a spare area on the memory to re-start the second control software without stopping the operation of the processing device.

Furthermore, the processor may be a multithread processor configured to execute the software in the memory as a plurality of threads.

According to the present invention, there is provided a failure recovery method for a processing device comprising a processor configured to execute predetermined control software stored in a memory to perform processing and a connecting unit having a plurality of slots to electrically connect a plurality of devices to the processor. The failure recovery method comprises: a step of switching, as a slot to which the device is connected, an arbitrary slot and a predetermined spare slot to each other in the plurality of slots; a step of causing the processor to execute the predetermined control software to manage slot information including path information between the processor and the device through the slot such that the slot information can be registered and updated; and a step of controlling the connecting unit such that the slot to which the device is connected is switched from the arbitrary slot to the spare slot on the basis of the slot information when a failure occurs in the arbitrary slot.

The failure recovery method according to the present invention may further comprise: a step of causing the processor to update the slot information from path information obtained through the arbitrary slot to path information obtained through the spare slot in switching to the spare slot; and a step of controlling switching from the arbitrary slot to the spare slot by the connecting unit on the basis of the updated slot information.

The failure recovery method according to the present invention may further comprise: a step of causing the processor to update an idle slot which is not connected to the device in the plurality of slots into spare slot information; and a step of causing the processor to cause the idle slot to function as the spare slot on the basis of the updated spare slot information.

The connecting unit may have a switch which can be connected to the spare slot. In this case, the failure recovery method may further comprise a step of connecting the device which is connected to the arbitrary slot to the spare slot.

The connecting unit may have a switch which can be connected to the arbitrary slot including the spare slot. In this case, the failure recovery method may further comprise a step of connecting the processor to the device through the switch.

The predetermined control software may have a first control software configured to control operations of the devices and a second control software configured to control operations of the slots of the connecting unit. In this case, the failure recovery method may further comprise: a step of causing the processor to perform a process of executing the first control software when the second control software is inoperative to reinput the second control software in a spare area on the memory to re-start the second control software without stopping the operation of the processing device.

Furthermore, the processor may be a multithread processor configured to execute the software in the memory as a plurality of threads.

According to the present invention, a spare slot to which an arbitrary slot can be switched is prepared to make it possible to reduce costs required for multiplexing and to shorten recovery operation time.

BRIEF DESCRIPTION OF THE DRAWINGS

In the accompanying drawings:

FIG. 1 is a schematic block diagram showing the entire configuration of a computer system according to a first embodiment of the present invention;

FIG. 2 is a schematic flow chart showing an operation of the computer system shown in FIG. 1;

FIG. 3A is a diagram for explaining SLOT information obtained before a failure occurs in the first embodiment, and FIG. 3B is a diagram for explaining SLOT information obtained after a failure occurs;

FIG. 4 is a schematic block diagram showing the entire configuration of a computer system according to a second embodiment of the present invention;

FIG. 6 is a schematic flow chart showing an operation of a spare SLOT restoring process by the computer system shown in FIG. 4.

DETAILED DESCRIPTION OF THE PREFERRED EMBODIMENTS

Figure 5:
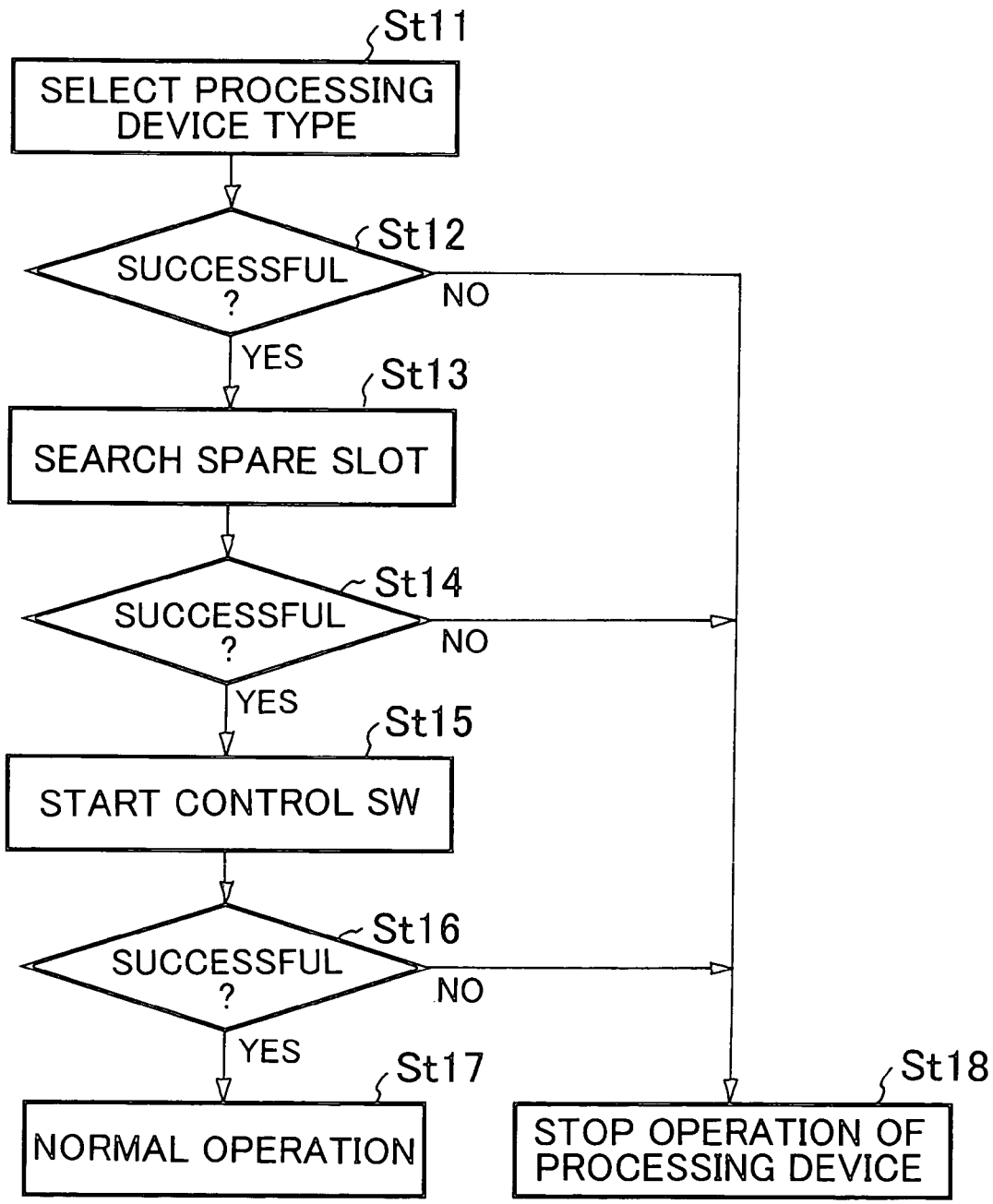
FIG. 5 is a schematic flow chart showing an operation of a spare SLOT switching process by the computer system shown in FIG. 4.

Various embodiments of a processing device, a failure recovery method therefor, and a failure restoration method according to the present invention will be described below with reference to the drawings.

First Embodiment

In the first embodiment of the present invention will be described below in detail with reference to the drawings.

In a computer system according to the embodiment, a processing device according to the present invention is applied, and a method of multiplexing a plurality of SLOTs is used as a failure recovery method for the processing device. In the embodiment, a failure recovering unit which manages all pieces of SLOT information to make it possible to switch a SLOT to a spare SLOT in occurrence of a failure is arranged. Under the control of the SLOTs, a switch is arranged such that necessary devices are connected in advance to make it possible to cope with the plurality of SLOTs, and the devices can be used in switching. In this manner, costs required for multiplexing are reduced, and recovery operation time required for a maintenance person can be shortened.

FIG. 1 shows the configuration of a computer system according to the embodiment.

A computer system shown in FIG. 1 includes a processor 101, a memory 131 constituting a memory space which can be used by the processor 101, and a data area 151 constituting a pre-set storing region except for the memory space. The computer system has a device 1 (161) serving as a connecting device or a connecting unit having a plurality (eight in FIG. 1) of SLOT 1 to SLOT 8 (numbers 1 to 8 correspond to slot numbers, respectively, and the example in FIG. 1 includes a SLOT 1 (171), a SLOT 2 (172), and a SLOT 8 (173)), connected to the processor 101, for connecting multiplexed devices. A plurality of devices are connected to the SLOTs 1 to 8 of the device 1 (161). In the embodiment, the SLOT 8 (173) of the device 1 (161) is used as a spare SLOT.

As the plurality of devices, for example, a recording device such as a magnetic disk device or an optical disk device, an input unit such as a CRT (Cathode Ray Tube) or a liquid crystal display, an indicating device such as a keyboard or a mouse, an input/output (IO: Input/Output) device such as a communication device which can be connected to a communication line such as a LAN (Local Area Network) or a telephone line, and the like are used. In the example in FIG. 1, as the plurality of devices, a device 2 (191) connected under the SLOT 1 (171) of the device 1 (161) and a device 3 (192) connected under the SLOT 2 (172) of the device 1 (161). The device 2 (191) and the device 3 (192) are also switchably connected under the SLOT 8 (173) of the device 1 (161) through a switch 181. The device 1 (161) and the switch 181 constitute a connecting unit according to the present invention.

The processor 101, in a hardware (HW) configuration, is constituted by a multithread processor (CPU) which can simultaneously execute software such as an operating system (OS) or various pieces of application software (AP) operated on the OS. The processor 101 functionally has a thread executing unit 110 which simultaneously executes two threads (thread 1 (111) and thread 2 (112)) and a thread selecting unit 121 which selects any one of a thread 1 (111) and a thread 2 (112) which are executed by the thread executing unit 110. Both the sections 110 and 121 are only functionally discriminated from each other. Independent circuit configurations or an integrated circuit configuration which can realize the same functions as described above can be applied as the units 110 and 121.

In the memory 131, in a memory space at a predetermined address, first control software (to be referred to as an "SW 1" hereinafter) 141, second control software (to be referred to as an "SW 2" hereinafter) 142, and SLOT information (see FIG. 3 will be described later) 143 are mapped.

The SW 1 (141) controls operations of the plurality of devices (the device 2 (191) and the device 3 (193) connected to the SLOT 1 171, the SLOT 2 (172), and the SLOT 8 (173)) connected to the SLOTs 1 to 8 of the device 1 (161). The SW 2 (142) controls the operation of the device 1 (161) having the SLOTs 1 to 8. The SLOT information 143 can be referred to or updated by the processing of the SW 1 (141) and the SW 2 (142). In addition, a spare area 144 serving as an idle area used at a restart or the like of the SW 2 (142) in response to a reload instruction issued by the SW 1 (141) is secured on the memory 131.

The SW 1 (141) and the SW 2 (142) are threaded by combining the operating system (OS) and the application software (AP), and the threaded SW 1 (141) and SW 2 (142) are executed on the processor 101. In the example in FIG. 1, the SW 1 (141) and the SW 2 (142) are executed on the processor 101 as the thread 1 (111) and the thread 2 (112). The SW 1 (141) and the SW 2 (142) refer to and update the SLOT information 143 which is present in the memory 131.

The SW 1 (141) controls stopping, reloading, and re-execution of the SW 2 (142) when the SW 2 (142) becomes inoperative.

The SW 2 (142) controls operations of the SLOTs 1 to 8 of the device 1 (161) depending on the SLOT information 143 to update the SLOT information 143, so that a switching operation from an arbitrary one of the SLOTs 1 to 7 of the device 1 (161A to the SLOT (spare SLOT) 8 of the device 1 (161) is controlled. At this time, physical information such as a SLOT number controlled by the SW 2 (142) is updated. However, logical information such as an IO number or a channel number allocated on the system in advance is not updated.

In the data area 151, the SW 2 (142) is held. When a failure occurs to make the SW 2 (142) in the memory 131 inoperative, the SW 2 (142) in the data area 151 is designed to reload, restart, and reinput the SW 2 (142) into the spare area 144 on the memory 131 by operation control performed by the SW 1 (141) in the memory 131.

An operation of the embodiment will be described below with reference to FIGS. 1 to 3.

FIG. 2 is a schematic flow chart showing an operation flow of the embodiment.

The processor 101 threads the SW 1 (141) and the SW 2 (142) arranged in the memory space at a predetermined address position on the memory 131 to execute the SW 1 (141) and the SW 2 (142). In the embodiment, for example, the thread of the SW 1 (141) arranged in memory space 2 is defined as the thread 2 (112), and the thread of the SW 2 (142) arranged in memory space 1 is defined as the thread 1 (111). In this case, the processor 101 detects a failure of a SLOT of the device 1 (161) (steps St1 and St2). This detection is performed by detecting a failure by operation control performed by executing the thread 2 (112) of the SW 1 (141) (step St1) or detecting whether time-out occurs when time required for an operation performed by the thread 2 (112) of the SW 1 (141) exceeds predetermined set time by operation control performed by executing the thread 1 (111) of the SW 2 (142) (step St2). As a result, when the failure of a SLOT of the device 1 (161) is detected, the processor 101 checks whether an operation performed by executing the thread 2 (112) of the SW 1 (141) can be possible (step St3).

When, as the check result in step St3, the SW 1 (141) is inoperative (step St3: NO), the processor 101 restarts the SW 1 (141) by operation control performed by executing the thread 1 (111) of the SW 2 (142) (step St4). The processor 101 checks whether the device 2 (191) or the device 3 (192) is accessible by operation control performed by executing the thread 2 (112) of the SW 1 (141) (step St5).

On the other hand, when, as the check result in step St3, the SW 1 (141) is operative (step St3: YES), the processor 101 checks whether the device 2 (191) or the device 3 (192) is accessible by operation control performed by execution of the thread 2 (112) of the SW 1 (141) (step St5).

When, as the check result in step St5, the device 2 (191) or the device 3 (192) is accessible (step St5: YES), the processor 101 does not perform a switching operation to the spare SLOT 8 (step St6).

On the other hand, when, as the check result in step St5, the device 2 (191) or the device 3 (192) is accessible (step St5: YES), the processor 101 performs a switching operation to the spare SLOT 8 on the basis of the SLOT information 143 by operation control performed by executing the thread 1 (111) of the SW 2 (142) (step St7).

FIGS. 3A and 3B are detailed diagrams of the SLOT information 143.

In a SLOT information 301 shown in FIGS. 3A and 3B, an SW number 302, a HW (hardware) thread number 303 input into the memory 131, a memory space 304 used by an SW, a path 305 controlled by the SW 1 (141) and the SW 2 (142), and a spare resource 306 which is switched as a spare in occurrence of a failure, and failure information 307 are registered.

FIG. 3A shows the SLOT information 301 obtained before a failure occurs (normal operation) when the failure occurs in the SLOT 1. In the example shown in FIG. 3A, the SLOT information 301 obtained before the failure of the SLOT 1 occurs is registered as follows.

1) SW number 201: "SW 1"; thread number 202: "thread 2"; memory space 203: "memory space 2"; path 204: "device 1-SLOT 1-device 2", spare resource 205: "thread 1", "memory space 3", "device 1-SLOT 8-switch-device 2"; failure information 206: unregistered.

2) SW number 201: "SW 1"; thread number 202: "thread 2"; memory space 203: "memory space 2"; path 204: "device 1-SLOT 2-device 3"; spare resource 205: "thread 1", "memory space 3", "device 1-SLOT 8-switch-device 3"; failure information 206: unregistered.

3) SW number 201: "SW 2"; thread number 202: "thread 1"; memory space 203: "memory space 1"; path 204: NO; spare resource 205: "thread 2", "memory space 3"; failure information 206: unregistered.

In the above state, when a failure occurs in the SLOT 1 (steps St1 and St2), the SW 1 (141) is operative (step St3: YES). For this reason, the processor 101 updates the path 204 corresponding to the SLOT 1 in which the failure occurs in the SLOT information 143 from the "device 1-SLOT 1-device 2" to the "device 1- SLOT 8-switch-device 2". The "device 1-SLOT 1-device 2" is registered as a failure path in the failure information 206.

FIG. 3B shows SLOT information 311 obtained after a failure occurs when the failure occurs in the SLOT 1. In the example in FIG. 3B, the SLOT information 301 obtained after the failure occurs in the SLOT 1 is updated from the above state to the following state.

1) SW number 201: "SW 1"; thread number 202: "thread 2"; memory space 203: "memory space 2"; path 204: "device 1—SLOT 8-switch-device 2", spare resource 205: "thread 1", "memory space 3"; failure information 206: "device 1-SLOT 1-device 2".

2) SW number 201: "SW 1"; thread number 202: "thread 2"; memory space 203: "memory space 2"; path 204: "device 1-SLOT 2-device 3"; spare resource 205: "thread 1", "memory space 3"; failure information 206: unregistered.

3) SW number 201: "SW 2"; thread number 202: "thread 1"; memory space 203: "memory space 1"; path 204: NO; spare resource 205: "thread 2", "memory space 3"; failure information 206: unregistered.

In this manner, the processor 101 switches the control from the SLOT 1 to the SLOT 8 serving as the spare slot by executing the thread 1 (111) of the SW 2 (142) on the basis of the SLOT information 143 obtained after the failure occurs in the SLOT 1 (step St7). Subsequently, the device 2 (191) is accessed through the SLOT 8. At this time, logical information such as an IO number or a channel number allocated by the SW 1 (141) on the system in advance is designed not to be updated.

In this manner, according to the configuration of the embodiment, since the logical information allocated on the system is not updated, an arbitrary SLOT can be switched to the spare SLOT. This is on the assumption that the SW 2 can be restarted because the effectiveness of preparation of the spare SLOT is reduced if the SW 2 which controls the SLOTs of the device 1 is set in an inoperative state.

Therefore, according to the embodiment, when a SLOT is broken down, the SLOT is automatically switched to the spare SLOT. For this reason, a manual recovery operation performed such that a maintenance person specifies a broken part to exchange the part can be reduced, and recovery operation time can be shortened. In addition, since the operation time is short, an influence of a decrease in performance of the device can be minimized.

According to the embodiment, a spare SLOT can be replaced with seven SLOTs, costs required for multiplexing can be reduced. Furthermore, since the SLOT and the spare SLOT have the same hardware configurations, a specific function need not be added to constitute the spare SLOT, and the costs can be more further reduced. In addition, when a device is broken down, the device is switched to a circuit having the same configuration as that of the device without being replaced with a redundant circuit, a reduction in performance can be suppressed.

The embodiment exemplifies that the position of the spare SLOT is set at the SLOT 8. However, the present invention is not limited to the example, and the position of the spare SLOT may be set at an arbitrary position. Furthermore, the number of all SLOTs is not limited to eight, and may be an arbitrary number except for eight. The number of spare SLOTs is not limited to one, and may be two or more.

Second Embodiment

A second embodiment of the present invention will be described below in detail with reference to the accompanying drawings.

In a computer system according to the embodiment, a processing device according to the present invention is applied, and a method which adds a spare SLOT is used as a failure recovery method. In the embodiment, a failure recovering unit which manages all pieces of SLOT information to make it possible to switch a broken SLOT to the spare SLOT in occurrence of a failure is arranged. A common switch is arranged under all the SLOTs such that all the SLOTs can function as the spare SLOT, and the switch can be used in addition of the spare SLOT.

FIG. 4 shows the configuration of a computer system according to the embodiment.

The computer system shown in FIG. 4 has two processors 400 and 401, a memory 410 constituting a memory space which can be used by both the processors 400 and 401, and an IO (Input Output) device 420 having SLOTs (421 to 429 in the example in FIG. 4) for connecting a plurality (nine in the example in FIG. 4) of multiplexed devices connected to both the processors 400 and 401. In the example in FIG. 4, of the SLOTs 421 to 429 of the IO device 420, LAN cards are loaded into the SLOTs 421 to 425, respectively, connected to devices 450 to 490 on a network 440 through a switch 430. A spare LAN card is loaded into the SLOT 429. The SLOT 429 is used as a spare SLOT. Furthermore, no LAN cards are not loaded into the remaining SLOTs 426 to 428 in the example in FIG. 4, and serve as idle SLOTs.

As cards which can be loaded into the SLOTs 421 to 429 including the spare SLOT, LAN cards and cards such as SCSI cards suitable for the devices connected under the SLOTs 421 to 429 can be selected. In the example in FIG. 4, the LAN cards are loaded into the SLOTs 421 to 425, respectively. A spare LAN card is also loaded into the SLOT 429, so that a switching operation can be performed even though a failure occurs in the SLOTs 421 to 425.

The SLOTs 421 to 425 and 429 are connected to the devices 450 to 490 through the switch 430. By employing a connecting method using the switch 430, the SLOTs 421 to 425 and 429 can be switched to all the devices 450 to 490 connected under the switch 430. In the example in FIG. 4, the SLOTs 421 to 425 are connected to the switch 430 through the LAN card, and are connected to the device 450 to 490 on the network 440 through the switch 430. More specifically, the SLOT 421 is connected to the maintenance managing device 450, the SLOT 422 is connected to the console device 460, the SLOT 424 is connected to the disk device 470, the SLOT 425 is connected to the tape device 480, and the SLOT 423 is connected to the network device 490. The SLOT 429 is connected to the switch 430 through the spare LAN card and is set in a waiting state of connection to the devices 450 to 490 under the control of the switch 430. In the example in FIG. 4, since the SLOTs 426 to 428 are not loaded with LAN cards, the SLOTs 426 to 428 are not connected to the switch 430.

Control software (SW) executed by the processors 400 and 401 and data managed by an operation of the control SW are stored in the memory 410.

The control SW is constituted by an SW which controls the devices 450 to 490 connected under the SLOTs and an SW which communicates with the devices 450 to 490 under the control of the SLOTs when the control SW itself is established as a device. In the example in FIG. 4, on the memory 410, a failure processing device control SW 414, a console device control SW 415, a network device control SW 416, a disk device control SW 417, and a tape device control SW 418 are mapped. The SWs 414 to 418 are executed by the processor 400 or the processor 401. In this manner, these functions are realized.

The functions of the SWs 414 to 418 are as follows. The failure processing device control SW 414 communicates with the maintenance managing device 450 through the SLOT 421. The console device control SW 415 controls the console device 460 through the SLOT 422. The network device control SW 416 communicates with the network device 490 through the SLOT 423. The disk device control SW 417 controls the disk device 470 through the SLOT 424. The tape device control SW controls the tape device 480 through the SLOT 425.

As the data in the memory 410, failure information 411, spare information 412, and switch configuration information 413 are set. These pieces of information 411 to 413 are managed by the control SWs in the memory 410 such that the pieces of information 411 to 413 can be registered and updated. For example, the failure information 411 includes a type of a device (processing device) connected to a SLOT loaded with a LAN card in which a failure occurs. The spare information 412 includes information (spare SLOT information) which can identify a SLOT functioning a spare SLOT of the plurality of SLOTs. Furthermore, the switch configuration information 413 includes information such as logical device names and addresses of LAN cards of the respective SLOTs.

In the example in FIG. 4, the failure information 411, the spare information 412, and the switch configuration information 413 are managed through the operations of the failure processing device control SW 414, the console device control SW 415, the network device control SW 416, the disk device control SW 417, and the tape device control SW 418 on the memory 410.

An operation of the embodiment will be described below with reference to FIGS. 5 and 6.

FIGS. 5 and 6 are schematic flow charts showing an operation flow of the embodiment. The operation of the embodiment can be explained by two operations including a spare SLOT switching operation shown in FIG. 5 and a spare SLOT restoring process shown in FIG. 6.

The spare SLOT switching operation will be described below with reference to FIG. 5.

In FIG. 5, a case in which the LAN card is broken down in the SLOT 423 will be considered. In this case, the processor 400 or 401 selects a type of a processing device connected to the broken LAN card (step St11). In this process, the processor 400 or 401 executes the network device control SW 416 in the memory 410 to recognize the failure of the LAN card loaded in the SLOT 423 (in this example, the network device 490 connected to the SLOT 423) is registered in the failure information 411 in the memory 410 and updated.

When the failure information 411 is successfully registered and updated (step St12: YES), the processor 400 or 401 searches for a spare SLOT (step St13). In this process, the processor 400 or 401 executes the network device control SW 416 in the memory 410 to se h for the spare SLOT loaded with the LAN card on the basis of the spare information 412 and updates the spare information 412. In the example, the SLOT 429 is se hed for as a spare SLOT. As the spare information 412, the SLOT 429 registered at the present is updated into the SLOT 423.

When the se h for the spare SLOT and the updating of the spare information 412 are successful (step St14: YES), the processor 400 or 401 starts the control SW (step St 115). In this process, the processor 400 or 401 executes the network device control SW 416 in the memory 410 to start the network device control SW (to be referred to as a "spare SLOT control SW") which controls the spare SLOT. The processor 400 or 401 executes the spare SLOT control SW takes over information such as a logical device name and an address of the broken LAN card in the SLOT 423 as information such as a logical device name and an address of the spare LAN card in the SLOT 429 from the switch configuration information 413, registers the information in the switch configuration information 413, and updates the information.

The above processes are successful (step St16: YES), a normal operation state is set (step St17). In this state, communication between the processor 400 or 401 and the network device 490 is performed through the SLOT 429 but the SLOT 423 in which a failure occurs due to occurrence of a failure in the LAN card. On the other hand, the SLOT 423 functions as a spare SLOT.

Any one of the processing device type selecting process, the spare SLOT searching process, and the control SW starting process is unsuccessful (step St12: NO, step St14: NO, and step St16: NO), the processor 400 or 401 returns the spare information 412 from the state (SLOT 423) set after the updating to the original state (SLOT 429) set before the updating to stop the operation of a processing device (the network device 490 in this example) connected to the broken LAN card (step St18).

An operation of a spare SLOT restoring process will be described below with reference to FIG. 6.

In FIG. 6, the processor 400 or 401 is set in a failure restoration waiting state of the SLOT 423 in which a failure occurs due to occurrence of a failure of the LAN card, i.e., an exchange waiting state of the LAN card in the SLOT 423 (step St21).

In this state, when the LAN card in the SLOT 423 is exchanged (step St22: YES), the processor 400 or 401 updates the spare information (spare SLOT information) 412 (step St23). In this process, the processor 400 or 401 executes the network device control SW 416 to update the spare information 412. More specifically, the spare information 412 is updated from the SLOT 423 switched in the spare SLOT switching process to the original SLOT 429.

When the process is successful (step St24: YES), the processor 400 or 401 stops the operation of the network device control SW 416 and shifts to the spare SLOT switching waiting state (step St25). In this manner, the SLOT which can function as a spare SLOT is restored from the SLOT 423 switched in the occurrence of the failure to the original SLOT 429.

In this manner, with the configuration of the embodiment, a SLOT in which a failure occurs can be switched to a spare SLOT even between different processing devices. In addition, after the slot in which the failure occurs is restored by repair or exchange, the slot can function as a spare slot again.

Therefore, according to the embodiment, when common cards are loaded into the slots, the spare SLOT can be shared by different processing devices to make it possible to reduce costs required for multiplexing. In a conventional technique, after a spare SLOT is returned to an original SLOT, and the spare SLOT is opened. However, in the embodiment, a SLOT in which a failure occurs is restored and then functioned as a spare SLOT again, the spare SLOT can be added without interrupting the operation.

In the embodiment, although a device having SLOTs is an IO device, another device may be used. In the embodiment, although a LAN card is loaded in a SLOT, a card of another type or a module such as a blade server. In the embodiment, although a SLOT in which a failure occurs is functioned as a spare SLOT, an idle SLOT may be functioned as a spare SLOT by the same process as described above.

As described above, the present invention can be applied to a processing device, a failure recovery method therefor, and a failure restoration method. In particular, the present invention can also be applied to computer systems in general.

What is claimed is:

1. A processing device comprising:
a processor configured to execute a predetermined control software stored in a memory to perform processing; and
a connecting unit having a plurality of slots to electrically connect a plurality of devices to the processor, wherein
said connecting unit is configured to switch, as a slot to which the device is connected, an arbitrary slot and a predetermined spare slot to each other in the plurality of slots,
said processor comprises:
a managing unit configured to manage slot information including path information between the processor and the device through the arbitrary slot such that the slot information can be registered and updated; and
a control unit configured to control the connecting unit such that the arbitrary slot to which the device is connected is switched from the arbitrary slot to the spare slot on the basis of the slot information when a failure occurs in the arbitrary slot,
said predetermined control software comprises:
a first control software configured to control operations of the devices; and
a second control software configured to control operations of the slots of the connecting unit, and wherein
said processor further comprises:
a processing unit configured to perform a process of threading the first control software and the second control software and executing the first control software when the second control software is inoperative and reinput the second control software in a spare area on the memory to re-start the second control software without stopping the operation of the processing device.

2. The processing device according to claim 1, wherein said processor further comprises:
a unit configured to update the slot information from path information obtained through the arbitrary slot to path information obtained through the spare slot in switching to the spare slot; and
a unit configured to control switching from the arbitrary slot to the spare slot by the connecting unit on the basis of the updated slot information.

3. The processing device according to claim 2, wherein said connecting unit comprises a switch which can be connected to the spare slot, said switch being configured to make it possible to connect the device connected to the arbitrary slot to the spare slot.

4. The processing device according to claim 1, wherein said processor is a multithread processor configured to execute the software in the memory as a plurality of threads.

5. A failure recovery method for a processing device comprising a processor configured to execute a predetermined control software stored in a memory to perform processing and a connecting unit having a plurality of slots to electrically connect a plurality of devices to the processor, said failure recovery method comprising:
a step of switching, as a slot to which the device is connected, an arbitrary slot and a predetermined spare slot to each other in the plurality of slots;
a step of causing said processor to manage slot information including path information between the processor and the device through the arbitrary slot such that the slot information can be registered and updated; and
a step of controlling said connecting unit such that the arbitrary slot to which the device is connected is switched from the arbitrary slot to the spare slot on the basis of the slot information when a failure occurs in the arbitrary slot, wherein
said predetermined control software having a first control software to control operations of the devices and a second control software to control operations of the slots of the connecting unit, and
said failure recovery method further comprises:
a step of causing the processor to perform a process of threading the first control software and the second control software and executing the first control software when the second control software is inoperative and reinput the second control software in a spare area on the memory to re-start the second control software without stopping the operation of the processing device.

6. The failure recovery method according to claim 5, further comprising:
a step of causing said processor to update the slot information from path information obtained through the arbitrary slot to path information obtained through the spare slot in switching to the spare slot; and
a step of controlling switching from the arbitrary slot to the spare slot by said connecting unit on the basis of the updated slot information.

7. The failure recovery method according to claim 6, wherein said connecting unit having a switch connected to the arbitrary slot, further comprising:
a step of connecting the device connected to the arbitrary slot to the spare slot through the switch.

8. A failure restoration method for restoring the processor using the failure recovery method according to claim 5, comprising:
a step of causing said processor to update slot information of an idle slot which is not connected to the device in the plurality of slots into spare slot information; and
a step of causing said processor to function the idle slot as the spare slot on the basis of the updated spare slot information.

9. The failure restoration method according to claim 8, further comprising:
a step of causing said processor to register and update the spare slot information; and
a step of causing said processor to function an arbitrary slot in the plurality of slots as the spare slot on the basis of the spare slot information.

10. The failure restoration method according to claim 9, wherein said connecting unit having a switch which can be connected to an arbitrary slot including the spare slot in the plurality of slots, further comprising:
a step of connecting said processor to the device through the switch.

* * * * *